US 6,747,830 B2

(12) United States Patent
Yano

(10) Patent No.: US 6,747,830 B2
(45) Date of Patent: Jun. 8, 2004

(54) PERPENDICULAR MAGNETIC RECORDING/READING APPARATUS

(75) Inventor: Koji Yano, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/227,478

(22) Filed: Aug. 26, 2002

(65) Prior Publication Data

US 2003/0058565 A1 Mar. 27, 2003

(30) Foreign Application Priority Data

Sep. 27, 2001 (JP) ........................................ 2001-298630

(51) Int. Cl.$^7$ .............................. G11B 5/03; G11B 5/02
(52) U.S. Cl. ......................... 360/66; 360/55; 360/264; 360/313; 360/124; 360/125; 360/122; 360/97.01
(58) Field of Search ...................... 360/66, 55, 264.7, 360/264, 125, 313, 319, 124, 97.01, 318, 122

(56) References Cited

U.S. PATENT DOCUMENTS

| 6,183,893 B1 | * | 2/2001 | Futamoto et al. | ...... 428/694 TS |
| 6,548,194 B2 | * | 4/2003 | Hikosaka et al. | .... 428/694 TM |
| 2002/0034052 A1 | * | 3/2002 | Takeo et al. | ............. 360/264.7 |

FOREIGN PATENT DOCUMENTS

| EP | 0 618 572 B1 | 7/2002 |
| JP | 07-129946 | * 5/1995 |
| JP | 11-238223 | 8/1999 |
| JP | 2000-315311 | 11/2000 |
| JP | 2001-298630 | 9/2001 |

OTHER PUBLICATIONS

Uwazumi et al., "Time Decay of Remanent Magnetization, Remanent Coercivity, and Readback Signal of Ultra–thin Longitudinal Co Cr12Ta12/Cr Thin Film Media",Sep. 1997, IEEE Transactions on Magnetics, vol. 33, No. 5, pp. 3031–3033.*
Shimatsu et al., "Experimental and Theoretical Analysis of Rotational Hysteresis Loss in CoCrTa Perpendicular Recording Media", Sep. 2000, IEEE Transactions on Magnetics, vol. 36, No. 5, pp. 2375–2377.*
Shimatsu et al., "Correction to–Experimental and Theoretical Analysis of Rotational Hysteresis Loss in CoCrTa Perpendicular Recording Media", Jul. 2001, IEEE Transactions on Magnetics, vol. 37, No. 4, pp. 3081.*
"Vertical Magnetic Recording Medium– Includes Soft Magnetic Layer and Anisotropic Layer," Derwent Accession No. 85–089723/15, JP 60038718–A, Feb. 28, 1985, 1 Page.

(List continued on next page.)

*Primary Examiner*—David Hudspeth
*Assistant Examiner*—Natalia Figueroa
(74) *Attorney, Agent, or Firm*—Pillsbury Winthrop LLP

(57) ABSTRACT

The maximum external magnetic field of a magnetic recording medium longitudinal component which is applied to a magnetic recording medium is smaller than an absolute value $H_n$ of a magnetic field at the intersection of a straight line connecting two points of an M-H curve in the longitudinal direction of a soft magnetic backing layer and a tangent of the M-H curve. One of the two points is a point $(H_s, M_s)$ at which magnetization saturates in the first quadrant. The other of the two points is a positive intersection $(0, M_r)$ of the M-H curve and the ordinate. The tangent is at a negative intersection $(-H_c, 0)$ of the M-H curve and the abscissa.

12 Claims, 3 Drawing Sheets

OTHER PUBLICATIONS

"Vertical Magnetic Recording Medium—Comprises Non-Magnetic Substrate, Highly Magnetically Permeable Layer and Magnetic Recording Layer Comprising Cobalt and Its Oxide," Derwent Accession No. 90-250081-33, JP 2173926-A, Jul. 1990, 1 Page.

"Magnetic-Recording Medium Used for Vertical Magnetic Memory- Has Magnetic Film with In-Plane Magnetization Simple Characteristic Which is Formed on One Side or Both Sides of Magnetic-Recording Film with Vertical Magnetization Simple Characteristic," Derwent Accession No. 2000-132256/12, JP 2000003509-A, Jan. 7, 2000, 1 Page.

* cited by examiner

PERPENDICULAR MAGNETIC RECORDING/READING APPARATUS

CROSS-REFERENCE TO RELATED APPLICATIONS

This application is based upon and claims the benefit of priority from the prior Japanese Patent Application No. 2001-298630, filed Sep. 27, 2001, the entire contents of which are incorporated herein by reference.

BACKGROUND OF THE INVENTION

1. Field of the Invention

The present invention relates to a perpendicular magnetic recording/reading apparatus using a perpendicular magnetic recording method which is expected as a high-density recording technique, and a magnetic recording medium used in this perpendicular magnetic recording/reading apparatus.

2. Description of the Related Art

Compared to a longitudinal magnetic recording layer, a perpendicular magnetic recording layer can perform high-density linear recording even with a large recording layer thickness and has a thermal decay resistance higher than that of a longitudinal magnetic recording layer. In particular, a perpendicular two-layered film medium having a high-permeability soft magnetic layer below a recording layer having perpendicular magnetic anisotropy makes ideal perpendicular recording possible by the interaction between a head and the soft magnetic layer. This can further increase the recording density. However, if this soft magnetic layer is formed in a recording medium, magnetization in the soft magnetic layer readily changes during disk rotation even with weak external magnetization. This lowers a recording signal or produces noise.

To improve this change in the magnetization of a soft magnetic layer, Jpn. Pat. Appln. KOKAI Publication No. 7-129946, for example, discloses a magnetization fixing layer for a backing layer which is formed between a soft magnetic backing layer and a substrate and which forms exchange coupling with the soft magnetic layer and has uniform magnetization. However, if a larger external magnetic field, such as that of a voice coil motor for head position control, is applied to a magnetic recording/reading apparatus, the magnetization directions in the magnetization fixing layer for a backing layer and the soft magnetic layer cannot be the same. This makes magnetization in the soft magnetic layer unstable.

BRIEF SUMMARY OF THE INVENTION

It is an object of the present invention to provide a magnetic recording/reading apparatus capable of reducing noise by stabilizing magnetic domains in a soft magnetic backing layer during recording and reproduction.

According to a first aspect of the invention, there is provided a perpendicular magnetic recording/reading apparatus comprising a perpendicular magnetic recording medium having a nonmagnetic substrate, and a magnetization fixing layer for a backing layer, soft magnetic backing layer, and perpendicular magnetic recording layer formed in the above order on the nonmagnetic substrate, wherein a maximum external magnetic field of a magnetic recording medium longitudinal component which is applied to the perpendicular magnetic recording medium is smaller than an absolute value $H_n$ of a magnetic field at an intersection of a straight line connecting two points of an M-H curve in the longitudinal direction of the soft magnetic backing layer and a tangent of the M-H curve, one of the two points being a point $(H_s, M_s)$ at which magnetization saturates in the first quadrant, the other of the two points being a positive intersection $(0, M_r)$ of the M-H curve and the ordinate, and the tangent being at a negative intersection $(-H_c, 0)$ of the M-H curve and the abscissa.

According to a second aspect of the invention, there is provided a perpendicular magnetic recording/reading apparatus comprising a perpendicular magnetic recording medium having a nonmagnetic substrate, and a magnetization fixing layer for a backing layer, soft magnetic backing layer, and perpendicular magnetic recording layer formed in the order named on the nonmagnetic substrate, wherein the perpendicular magnetic recording medium has a recording area in which magnetization directions in the magnetization fixing layer for a backing layer and the soft magnetic backing layer are the same direction owing to an exchange coupling interaction, and a non-recording area in which the magnetization directions are not the same direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the generation description given above and the detailed description of the preferred embodiments given below, serve to explain the principles of the invention.

DETAILED DESCRIPTION OF THE INVENTION

Figure 1:
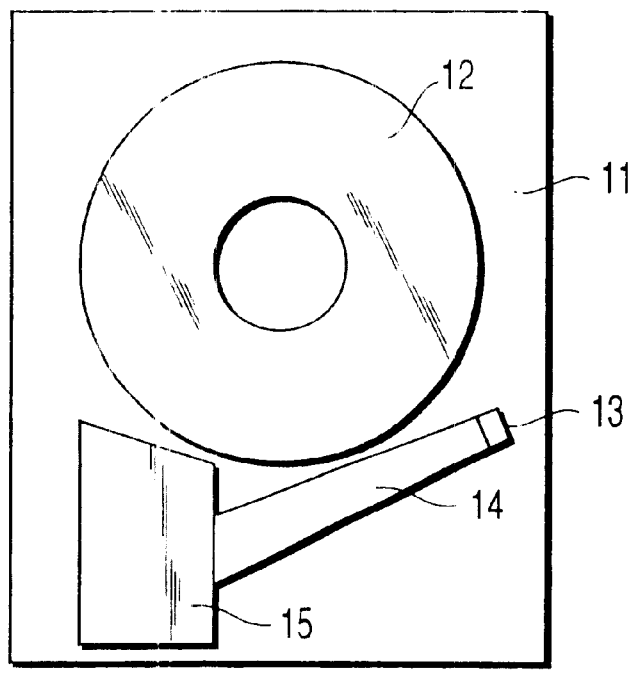
FIG. 1 is a view showing an outline of an example of a perpendicular magnetic recording/reading apparatus according to the present invention.

A perpendicular magnetic recording/reading apparatus according to the first aspect of the present invention comprises a perpendicular magnetic recording medium having a nonmagnetic substrate, and a magnetization fixing layer for a backing layer, soft magnetic backing layer, and perpendicular magnetic recording layer formed in the order named on the nonmagnetic substrate, wherein a maximum external magnetic field of a magnetic recording medium longitudinal component which is applied to the magnetic recording medium is smaller than a nuclear field $H_n$ indicated by an absolute value of a magnetic field at an intersection of a straight line connecting two points of an M-H curve in the longitudinal direction of the soft magnetic backing layer and a tangent of the M-H curve, one of the two points being a point ($H_s$, $M_s$) at which magnetization saturates in the first quadrant, the other of the two points being a positive intersection (0, $M_r$) of the M-H curve and the ordinate, and the tangent being at a negative intersection ($-H_c$, 0) of the M-H curve and the abscissa.

In the present invention, the maximum external magnetic field of the magnetic recording medium longitudinal component which is applied to the magnetic recording medium is smaller than $H_n$. Therefore, magnetization in the soft magnetic backing layer transits while the value of saturation magnetization is held, so the M-H curve does not form a minor loop. Accordingly, the magnetization directions in the soft magnetic backing layer and the magnetization fixing layer for a backing layer become the same owing to the exchange coupling interaction.

If the maximum external magnetic field is equal to or larger than $H_n$, the M-H curve forms a minor loop, and this brings about the disadvantage that the reproduction magnetic field becomes small, and the signal output becomes small.

A perpendicular magnetic recording/reading apparatus according to the second aspect of the present invention comprises a perpendicular magnetic recording medium having a nonmagnetic substrate, and a magnetization fixing layer for a backing layer, soft magnetic backing layer, and perpendicular magnetic recording layer formed in the order named on the nonmagnetic substrate, wherein the perpendicular magnetic recording medium has a recording area in which magnetization directions in the magnetization fixing layer for a backing layer and the soft magnetic backing layer are the same owing to an exchange coupling interaction, and a non-recording area in which the magnetization directions are not the same direction.

According to the second aspect of the present invention, an area which is outside the recording area and in which the magnetization directions in the magnetization fixing layer for a backing layer and the soft magnetic backing layer are not the same is formed as a non-recording area beforehand. Consequently, the magnetization directions in the magnetization fixing layer for a backing layer and the soft magnetic backing layer can be the same in the recording area, and noise can be prevented.

The perpendicular magnetic recording/reading apparatuses according to the first and second aspects of the present invention preferably further comprise a driving mechanism which supports and rotates the perpendicular magnetic recording medium, a magnetic head having an element which records information on the perpendicular magnetic recording medium and an element which reads recorded information, and a carriage assembly which supports the magnetic head to be movable with respect to the perpendicular magnetic recording medium.

The present invention will be described in more detail below with reference to the accompanying drawing.

FIG. 1 is a view showing an outline of an example of a perpendicular magnetic recording/reading apparatus according to the present invention.

As shown in FIG. 1, this perpendicular magnetic recording/reading apparatus includes a perpendicular magnetic disk 12 of, e.g., 2.5 inches, a magnetic head 13, a head suspension 14, and a voice coil motor 15 for head position control, in a housing 11 having a size of, e.g., 6.985×10.00 cm.

Note that the perpendicular magnetic recording/reading apparatus of the present invention is not restricted to the arrangement shown in FIG. 1.

The perpendicular magnetic disk 12 has a structure in which at least a magnetization fixing layer for a backing layer, soft magnetic backing layer, perpendicular magnetic recording layer, and surface protective layer are stacked on a substrate made of aluminum or reinforced glass. An intermediate control layer can be added to this stacked structure as needed. One characteristic required of this magnetic disk is low media noise. More specifically, it is necessary to produce no spike noise, reduce colored wide-band noise as a whole, and decrease the frequency characteristics. However, the backing layer of the magnetic disk is a soft magnetic material having a small coercive force $H_c$, so this backing layer tends to form magnetic walls under the influence of an external magnetic field. When the head passes over these magnetic walls, spike noise is produced in a reproduced signal output. Hence, a structure in which magnetic walls are not easily formed in the soft magnetic backing layer is desired.

The voice coil motor 15 uses, e.g., an Nb—Fe—B-based magnet, and the strength of this magnet is about 4,000 Gauss. To avoid a strong magnetic field of this magnet, the perpendicular magnetic disk 12 is separated by about 3 mm or more, preferably, 4 to 10 mm from the voice coil motor 15.

Two structures are primarily proposed as the structure in which magnetic walls are hardly formed in the soft magnetic backing layer. One is a structure in which the soft magnetic backing layer is formed of fine grains. The other is a structure in which a magnetization fixing layer for a backing layer is stacked on the soft magnetic backing layer to fix the magnetization of this soft magnetic backing layer in a predetermined direction.

The present invention uses the latter structure.

The magnetization fixing layer for a backing layer is generally a hard magnetic material and has a large $H_c$. Hence, even if an external magnetic field of a sensibly possible size is applied, the magnetization direction does not reverse. Therefore, when the magnetization of this magnetization fixing layer for a backing layer is fixed in a predetermined direction by intentionally applying a large magnetic field, this magnetization maintains the predetermined direction for a long time period. For example, when after film formation an external magnetic field larger than the $H_c$ of the magnetization fixing layer for a backing layer is applied in the radial direction of the magnetic disk, the magnetization of the magnetization fixing layer for a backing layer is fixed in this magnetic field application direction and points in the same direction for a long period of time. If this magnetization fixing layer for a backing layer and the soft magnetic backing layer are in contact with each other or within the range in which they affect each other, the exchange coupling interaction acts on these two layers, and this makes the magnetization directions in the two layers equal. Since the magnetization direction in the magnetization fixing layer for a backing layer can be controlled by the applied magnetic field, the magnetization direction in the soft magnetic backing layer can also be controlled.

Figure 2:
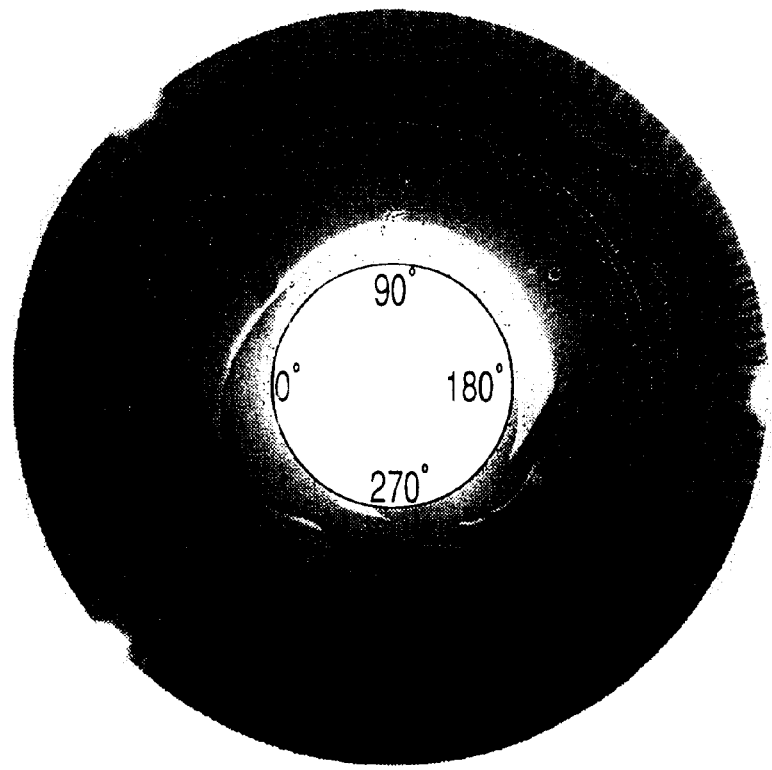
FIG. 2 is an image data showing the result of measurement performed by an optical surface analyzer (OSA) on an example of a disk in which a soft magnetic backing layer and a surface protective layer are formed.

FIG. 2 is a view showing an image data representing the result of measurement performed by an optical surface analyzer on an example of a disk in which a soft magnetic backing layer and a surface protective layer are formed. Referring to FIG. 2, the direction of magnetization of a longitudinal component of the disk is observed with an optical surface analyzer (OSA) using the Kerr effect. In a portion where the tone changes, magnetization reversal occurs and a magnetic wall is formed. FIG. 2 shows that magnetic walls are formed on the entire edges of this disk, and that many magnetic walls are formed particularly on the outer edge owing to the influence of the edge. This indicates that the soft magnetic backing layer having a low $H_c$ easily causes magnetization reversal and readily forms magnetic walls.

Figure 3:
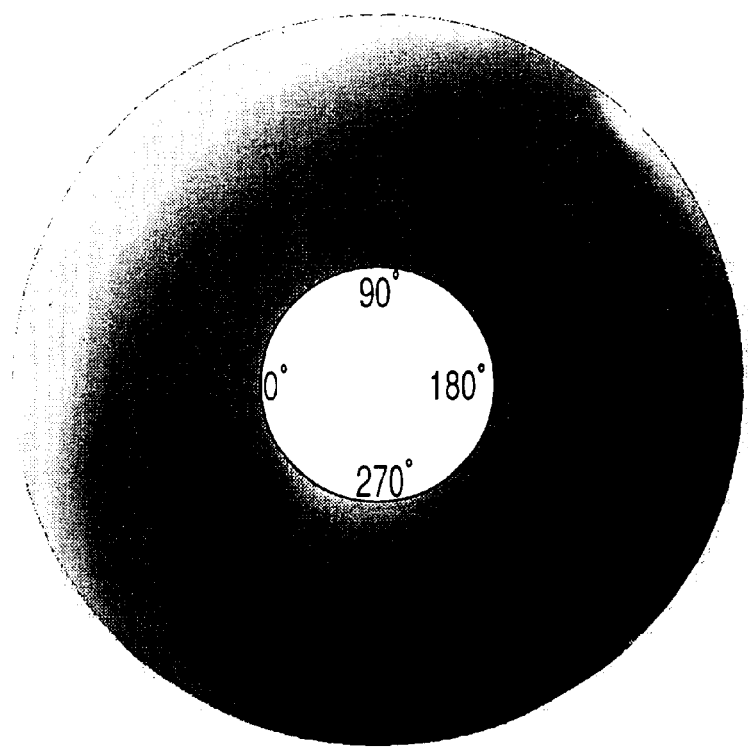
FIG. 3 is an image data showing the result of measurement performed by the OSA on a disk having a magnetization fixing layer for a backing layer, soft magnetic backing layer, and surface protective layer.

FIG. 3 is a view showing an image data representing the result of measurement performed by the OSA on an example of a-disk having a magnetization fixing layer for a backing layer, soft magnetic backing layer, and surface protective layer on a substrate. Magnetization in the magnetization fixing layer for a backing layer uniformly points in the radial direction when an external magnetic field larger than $H_c$ is intentionally applied. Therefore, magnetization in the soft magnetic backing layer also points in the same direction as the magnetization fixing layer for a backing layer, i.e., points in the radial direction, by exchange coupling. This demonstrates that the soft magnetic backing layer of the magnetic disk used in the present invention does not form magnetic walls unless a large external magnetic field by which the magnetization directions in the magnetization fixing layer for a backing layer and the soft magnetic backing layer are no longer equal is applied.

Figure 4:
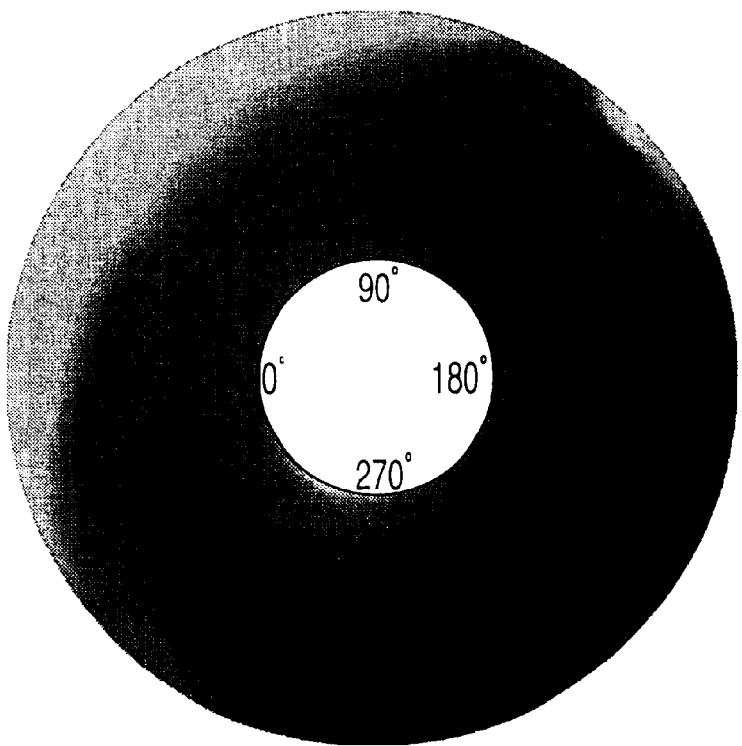
FIG. 4 is an image data showing the result of measurement performed by the OSA after a disk similar to that shown in FIG. 3 is rotated by a drive.
Figure 5:
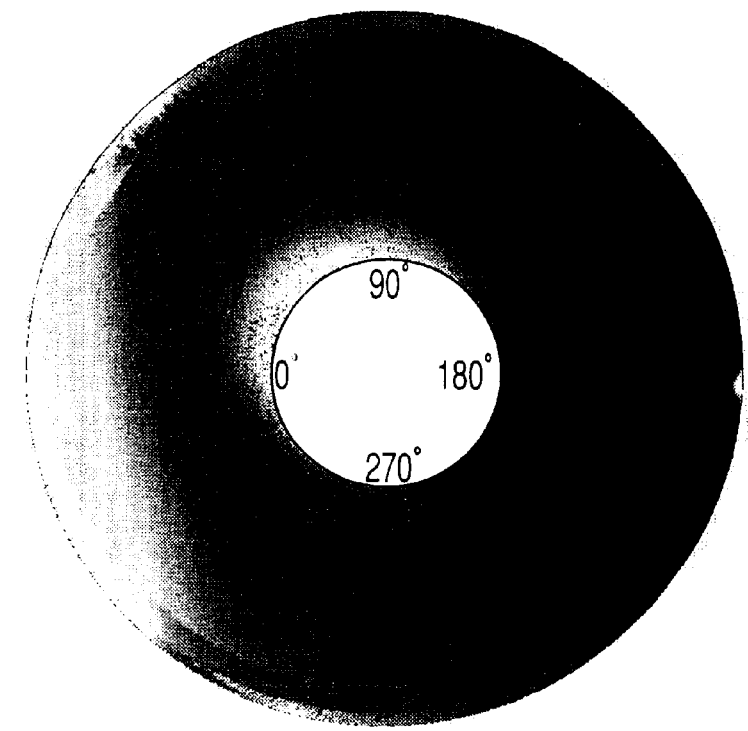
FIG. 5 is an image data showing the result of measurement performed by the OSA after a disk similar to that shown in FIG. 3 is rotated by a drive.

FIGS. 4 and 5 are image datas representing the results of measurements performed by the OSA after disks similar to that shown in FIG. 3 are rotated. Note that the magnetization direction of the disk shown in FIG. 4 is from the outer edge to the inner edge of the disk, and the magnetization direction of the disk shown in FIG. 5 is from the inner edge to the outer edge of the disk. During the measurements, no head loading is performed. In FIG. 4, the disk remains the same as it is before rotation. However, magnetic walls are formed along the outer edge in FIG. 5. This is so because the magnetization directions in the soft magnetic backing layer and the magnetization fixing layer for a backing layer are no longer the same owing to the longitudinal component of a magnetic field applied from the magnet of the voice coil motor to the magnetic disk. The difference between the magnetic disks shown in FIGS. 4 and 5 is the magnetization direction in the magnetization fixing layer for a backing layer. The magnetization directions in the soft magnetic backing layer and the magnetization fixing layer for a backing layer are no longer the same only in the magnetic disk shown in FIG. 5, because the magnetization direction in the soft magnetic backing layer is opposite to the direction of the longitudinal component of the magnetic field of the voice coil motor.

From the foregoing, in a perpendicular magnetic recording apparatus using a magnetic disk having a magnetization fixing layer for a backing layer, an effective means for preventing the formation of magnetic walls in a soft magnetic backing layer is to align the direction of the longitudinal component of a magnetic field of a voice coil motor with the magnetization direction in the soft magnetic backing layer. However, a perpendicular magnetic recording/ reading apparatus sometimes uses a plurality of magnetic disks, so it is difficult to align the magnetization directions in the soft magnetic backing layers of all the magnetic disks with the direction of a leakage magnetic field of the voice coil motor. Even if this is possible, it is necessary to prepare two types of magnetic disks in which the magnetization directions in the magnetization fixing layer for a backing layer and the soft magnetic backing layer are different. This poses a new problem in terms of cost.

In practice, therefore, it is presumably important to suppress the leakage magnetic field of the voice coil motor, or to make the magnetization direction in the soft magnetic backing layer the same as that in the magnetization fixing layer for a backing layer, and to obtain a structure in which the magnetization directions in the magnetization fixing layer for a backing layer and the soft magnetic backing layer are the same even if the direction of the leakage magnetic field of the voice coil motor is opposite to the magnetization direction in the soft magnetic backing layer.

The magnetization directions in the soft magnetic backing layer and the magnetization fixing layer for a backing layer are the same owing to the exchange coupling interaction. If the magnetization directions in the soft magnetic backing layer and the magnetization fixing layer for a backing layer of the perpendicular magnetic recording layer become partially different owing to an external magnetic field, the consequent external coupling magnetic field often further makes the magnetization directions different over a broad range. The present inventors first attempted to prevent the magnetization directions in the soft magnetic backing layer and the magnetization fixing layer for a backing layer from becoming different even in a portion of the perpendicular magnetic recording layer.

Figure 6:
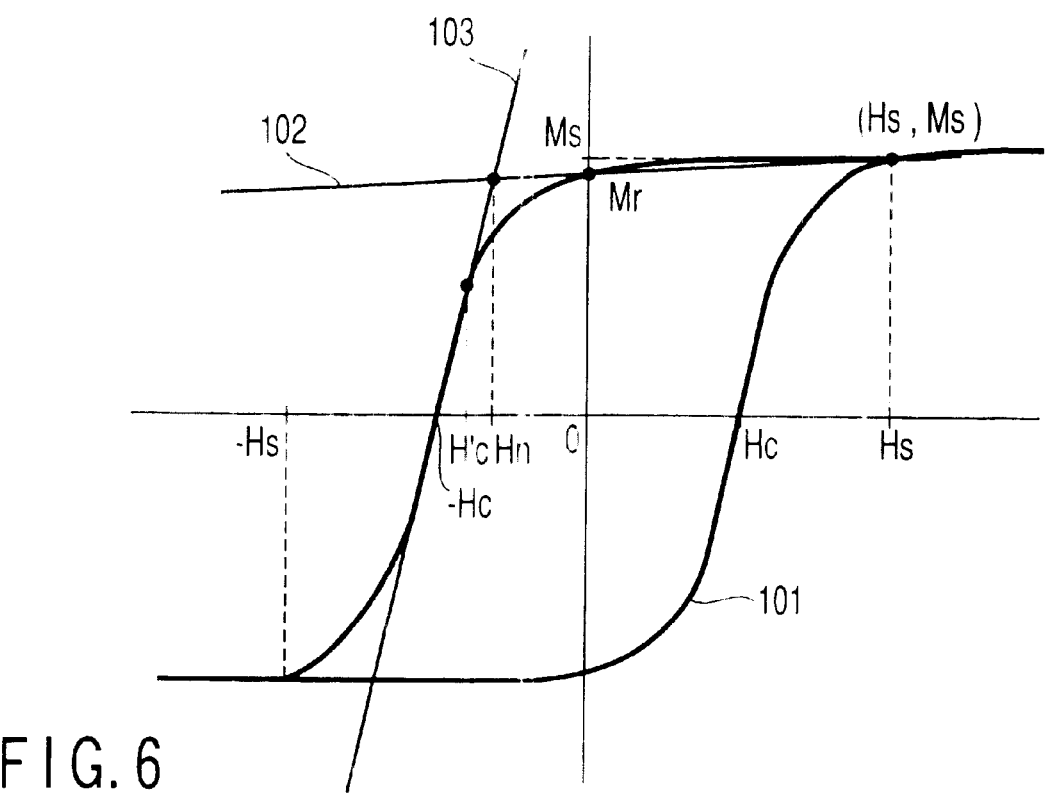
FIG. 6 is an image data showing an M-H curve in the longitudinal direction of the soft magnetic backing layer.

FIG. 6 is a graph showing M-H curves in the longitudinal direction of the soft magnetic backing layer.

As shown in FIG. 6, this $H_n$ at least contains the absolute value of a magnetic field at the intersection of a straight line 102 and a tangent 103. The straight line 102 connects two points of an M-H curve 101 in the soft magnetic backing layer longitudinal direction: one is a point ($H_s$, $M_s$) at which magnetization saturates in the first quadrant, and the other is a positive intersection (0, $M_r$) of this curve 101 and the ordinate. The tangent 103 is at a negative intersection (−$H_c$, 0) of the curve 101 and the abscissa. Even when an external magnetic field $H_n$' larger than the magnetic field at the intersection of the straight lines 102 and 103 is applied and the magnetization becomes smaller than the saturation magnetization $M_s$, if the magnetization restores to the original saturation magnetization $M_s$ when a magnetic field smaller than $H_n$ is applied again, this $H_n$' is included in the range of $H_n$ used in the present invention in a broad sense.

From the foregoing, to prevent the formation of magnetic walls in the soft magnetic backing layer of the magnetic disk, the magnetization directions in the soft magnetic backing layer and the magnetization fixing layer for a backing layer are desirably the same throughout the entire magnetic disk surface. According to the first aspect of the present invention, therefore, the maximum value of the external magnetic field applied to the magnetic disk is smaller than the $H_n$ of the soft magnetic backing layer. When this is met, magnetization in the soft magnetic backing layer transits while the value of saturation magnetization is held, so the M-H loop does not become a minor loop. Accordingly, the magnetization directions are always the same because the exchange coupling between the soft magnetic backing layer and the magnetization fixing layer for a backing layer remains strong.

Also, in the magnetic disk, if the magnetization directions in the soft magnetic backing layer and the magnetization fixing layer for a backing layer are partially out of alignment, the consequent exchange coupling magnetic field makes these magnetization directions different over a broad range. Hence, it is important to prevent the magnetization directions from becoming different even in a portion of the disk. Accordingly, it is preferable that on the outermost edge where the maximum external magnetic field of the magnetic disk longitudinal component applied to the magnetic disk is probably a maximum, the maximum external magnetic field of the applied magnetic disk longitudinal component is smaller than the $H_n$ of the soft magnetic backing layer. Consequently, no magnetic walls are formed in the soft magnetic backing layer.

In the magnetic recording/reading apparatus, data is recorded in a recording area (data zone) of the magnetic disk. Therefore, even if magnetic walls are formed in the soft magnetic backing layer in a portion other than the data zone, reproduction is not adversely affected. According to the second aspect of the present invention, therefore, an area in which the magnetization directions are the same owing to the exchange coupling interaction is used as a recording area, and an area in which the magnetization directions are not the same is used as a non-recording area.

Also, the present inventors studied the conditions under which the magnetization directions are the same direction on the outermost perimeter of the data zone on the outermost edge of the magnetic disk. FIG. 5 reveals that the $H_n$ of the magnetic disk in which the magnetization directions obtained by the exchange coupling interaction are no longer the same is about 3,950 A/m (50 Oe). However, another experiment shows that an external magnetic field of only about 1,975 A/m (25 Oe) is applied from the voice coil motor to this radial position. This indicates that an action other than the external magnetic field is also an element which makes the magnetization directions different from each other.

The present inventors then studied the state of a portion where the magnetization directions of the magnetic disk are not the same. The magnetization direction in the soft magnetic backing layer in this portion is opposite to that in a portion where the magnetization directions in the magnetization fixing layer for a backing layer and the soft magnetic backing layer are the same owing to the exchange coupling interaction. This allows a demagnetizing field resulting from magnetization in the soft magnetic backing layer having the opposite magnetization direction to act in the direction in which the magnetization directions remain different. Hence, in a magnetic disk in which the magnetization directions are not the same even in a portion, the magnetization directions may not be the same inside that portion even if the $H_n$ is larger than the external magnetic field, under the influence of the demagnetizing field of the backing layer having the opposite magnetization direction. When this demagnetizing field is taken into consideration, therefore, to make the magnetization directions equal on the outermost perimeter of the data zone, the sum of the maximum applied magnetic field on the outermost perimeter of the data zone and the demagnetizing field of the soft magnetic backing layer in a portion where the magnetization directions are not the same is desirably equal to or less than $H_n$.

A demagnetizing field $H_{xm}$ of the soft magnetic backing layer will be described below on the basis of the above consideration. First, letting $M_r$(A/M) be the residual magnetization, t(m) be the film thickness, a be a magnetization reversal coefficient, and x(m) be the distance from a magnetization reversal position, a demagnetizing field H(x) (A/m) of single reversal magnetization is represented by $$H(x) = M_r/\pi\mu_0 \cdot (\tan^{-1}((t/2+a)/x) - \tan^{-1}((-t/2-a)/x) - 2 \cdot \tan^{-1}(a/x)) \quad (1)$$

Also, a magnetic field H(a) separated from the magnetization reversal position by the magnetization reversal distance a is $M_r/2$. Regarding the M-H curve shown in FIG. 6 as a parallelogram, a magnetic field by which the residual magnetization is $M_r/2$ is $(H_c+H_n)/2$. Hence, H(a) is represented by $$H(a) = (H_c+H_n)/2 \quad (2)$$

Equation (3) below can be derived from equations (1) and (2) above.

$$H(a) = M_r/\pi\mu_0 \cdot (\tan^{-1}((t/2+a)/a) - \tan^{-1}((-t/2-a)/a) - 2 \cdot \tan^{-1}(a/a)) \quad (3)$$
$$= M_r/\pi\mu_0 \cdot (2 \cdot \tan^{-1}(t/(2a)+1) - \pi)$$
$$= (H_c + H_n)/2$$

In addition, a maximum value $H_{xm}$ of H(x) is represented by $$H_{xm} = 2 \cdot M_r/(\pi\mu_0) \cdot \tan^{-1}((t/4)/(a(a+t/2))^{1/2}) \quad (4)$$

From equations (3) and (4), the demagnetizing field $H_{xm}$ of soft magnetic backing layer can be derived. A magnetic field applied to the magnetic disk is the sum of the demagnetizing field $H_{xm}$ and an external magnetic field $H_{ex}$ which is longitudinal component applied to the outmost perimeter of the recording area of the magnetic recording medium, and must be smaller than $H_n$ even when $H_{ex}+H_n$ is a maximum. Hence, this magnetic field is represented by $$H_{xm}+H_{ex}<H_n \quad (5)$$

Accordingly, when $H_{ex}$ has a magnitude meeting equation (5) above, the exchange coupling interaction between the magnetization fixing layer for a backing layer and the soft magnetic backing layer is not lost in a recording area, even in a magnetic disk having in a non-recording area a portion where the magnetization directions in the magnetization fixing layer for a backing layer and the soft magnetic backing layer are not the same.

As described above, the present invention can provide a magnetic recording/reading apparatus capable of stabilizing magnetic domains in a soft magnetic backing layer used in a magnetic recording medium, and capable of stably recording data with low noise even when recording and reproduction are repeated.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A perpendicular magnetic recording/reading apparatus comprising a perpendicular magnetic recording medium including a nonmagnetic substrate, and a magnetization fixing layer for a backing layer, a soft magnetic backing layer, and a perpendicular magnetic recording layer formed in the order on said nonmagnetic substrate, wherein a maximum external magnetic field of a magnetic recording medium longitudinal component which is applied to said perpendicular magnetic recording medium is smaller than an absolute value $H_n$ of a magnetic field at an intersection of a straight line connecting two points of an M-H curve in the longitudinal direction of said soft magnetic backing layer and a tangent of the M-H curve, one of the two points being a point ($H_s$, $M_s$) at which magnetization saturates in the first quadrant, the other of the two points being a positive intersection (0, $M_r$) of the M-H curve and the ordinate, and the tangent being at a negative intersection ($-H_c$, 0) of the M-H curve and the abscissa, and the maximum external magnetic field of the magnetic recording medium longitudinal component which is applied to the outermost perimeter of a recording area of said perpendicular magnetic recording medium is smaller than the $H_n$ of said soft magnetic backing layer.

2. An apparatus according to claim 1, further comprising a driving mechanism which supports and rotates said perpendicular magnetic recording medium, a magnetic head having an element which records information on said perpendicular magnetic recording medium and an element which reproduces recorded information, a carriage assembly which supports said magnetic head to be movable with respect to said perpendicular magnetic recording medium, and a driving motor which moves said carriage assembly to control the head position.

3. A perpendicular magnetic recording/reading apparatus comprising a perpendicular magnetic recording medium including a nonmagnetic substrate, and a magnetization fixing layer for a backing layer, a soft magnetic backing layer, and a perpendicular magnetic recording layer formed in the order on said nonmagnetic substrate, wherein a maximum external magnetic field of a magnetic recording medium longitudinal component which is applied to said perpendicular magnetic recording medium is smaller than an absolute value $H_n$ of a magnetic field at an intersection of a straight line connecting two points of an M-H curve in the longitudinal direction of said soft magnetic backing layer and a tangent of the M-H curve, one of the two points being a point ($H_s$, $M_s$) at which magnetization saturates in the first quadrant, the other of the two points being a positive intersection (0, $M_r$) of the M-H curve and the ordinate, and the tangent being at a negative intersection ($-H_c$, 0) of the M-H curve and the abscissa, and a spacing between said perpendicular magnetic recording medium and said driving motor is not less than about 3 mm.

4. An apparatus according to claim 3, wherein the spacing between said perpendicular magnetic recording medium and said driving motor is about 4 to 10 mm.

5. An apparatus according to claim 3, further comprising:
a driving mechanism which supports and rotates said perpendicular magnetic recording medium,
a magnetic head having an element which records information on said perpendicular magnetic recording medium and an element which reproduces recorded information,
a carriage assembly which supports said magnetic head to be movable with respect to said perpendicular magnetic recording medium, and
a driving motor which moves said carriage assembly to control the head position.

6. A perpendicular magnetic recording/reading apparatus comprising a perpendicular magnetic recording medium having a nonmagnetic substrate, and a magnetization fixing layer for a backing layer, soft magnetic backing layer, and perpendicular magnetic recording layer formed in the order named on said nonmagnetic substrate, wherein said perpendicular magnetic recording medium has a recording area in which magnetization directions in said magnetization fixing layer for a backing layer and said soft magnetic backing layer are the same direction owing to an exchange coupling interaction, and a non-recording area in which the magnetization directions are not the same direction, and the sum of a maximum external magnetic field of a magnetic recording medium longitudinal component which is applied to the outermost perimeter of said recording area, and a demagnetizing field of said soft magnetic backing layer in a portion of said perpendicular magnetic recording layer in which the magnetization directions in said magnetization fixing layer for a backing layer and said soft magnetic backing layer are not the same direction, is smaller than the $H_n$ of said soft magnetic backing layer.

7. An apparatus according to claim 6, further comprising a driving mechanism which supports and rotates said perpendicular magnetic recording medium, a magnetic head having an element which records information on said perpendicular magnetic recording medium and an element which reproduces recorded information, a carriage assembly which supports said magnetic head to be movable with respect to said perpendicular magnetic recording medium, and a driving motor which moves said carriage assembly to control the head position.

8. A perpendicular magnetic recording/reading apparatus comprising a perpendicular magnetic recording medium having a nonmagnetic substrate, and a magnetization fixing layer for a backing layer, soft magnetic backing layer, and perpendicular magnetic recording layer formed in the order named on said nonmagnetic substrate, wherein said perpendicular magnetic recording medium has a recording area in which magnetization directions in said magnetization fixing layer for a backing layer and said soft magnetic backing layer are the same direction owing to an exchange coupling interaction, and a non-recording area in which the magnetization directions are not the same direction, and letting $M_r$ be the residual magnetization in said magnetic recording medium, t be the film thickness, $H_c$ be the coercive force of said soft magnetic backing layer, $H_{ex}$ be the longitudinal component applied to the outermost perimeter of said recording area of said magnetic recording medium, and $H_{xm}$ be the demagnetizing field of soft magnetic backing layer equations (a) to (b) below are met:

$$M_r/\pi\mu_0 \cdot (2 \cdot \tan^{-1}(t/(2a)+1)-\pi)=(H_c+H_n)/2+H_{ex} \quad \text{(a)}$$

$$H_{xm}=2 \cdot M_r/(\pi\mu_0) \cdot \tan^{-1}((t/4)/(a(a+t/2))1/2) \quad \text{(b)}$$

$$H_{xm}+H_{ex}<H_n \quad \text{(c).}$$

9. An apparatus according to claim 8, further comprising:
a driving mechanism which supports and rotates said perpendicular magnetic recording medium,
a magnetic head having an element which records information on said perpendicular magnetic recording medium and an element which reproduces recorded information,
a carriage assembly which supports said magnetic head to be movable with respect to said perpendicular magnetic recording medium, and
a driving motor which moves said carriage assembly to control the head position.

10. A perpendicular magnetic recording/reading apparatus comprising a perpendicular magnetic recording medium having a nonmagnetic substrate, and a magnetization fixing layer for a backing layer, soft magnetic backing layer, and perpendicular magnetic recording layer formed in the order named on said nonmagnetic substrate, wherein said perpendicular magnetic recording medium has a recording area in which magnetization directions in said magnetization fixing layer for a backing layer and said soft magnetic backing layer are the same direction owing to an exchange coupling interaction, and a non-recording area in which the magnetization directions are not the same direction, and a spacing between said perpendicular magnetic recording medium and said driving motor is not less than about 3 mm.

11. An apparatus according to claim 10, wherein the spacing between said perpendicular magnetic recording medium and said driving motor is about 4 to 10 mm.

12. An apparatus according to claim 10, further comprising:

a driving mechanism which supports and rotates said perpendicular magnetic recording medium, a magnetic head having an element which records information on said perpendicular magnetic recording medium and an element which reproduces recorded information, a carriage assembly which supports said magnetic head to be movable with respect to said perpendicular magnetic recording medium, and a driving motor which moves said carriage assembly to control the head position.

\* \* \* \* \*